(No Model.) 2 Sheets—Sheet 1.

G. DEMENY.
SERIES PHOTOGRAPHIC CAMERA.

No. 544,480. Patented Aug. 13, 1895.

Witnesses
Albert Jones.
John F. Gairns.

Inventor
George Demeny
By his Attorneys
Wheatley & Mackenzie (No Model.) 2 Sheets—Sheet 2.
G. DEMENY.
SERIES PHOTOGRAPHIC CAMERA.
No. 544,480. Patented Aug. 13, 1895.
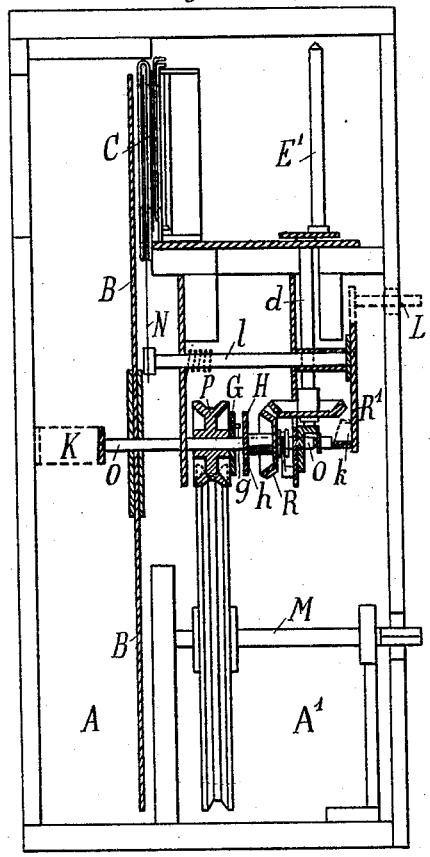
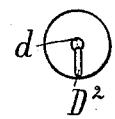
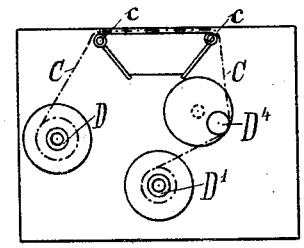
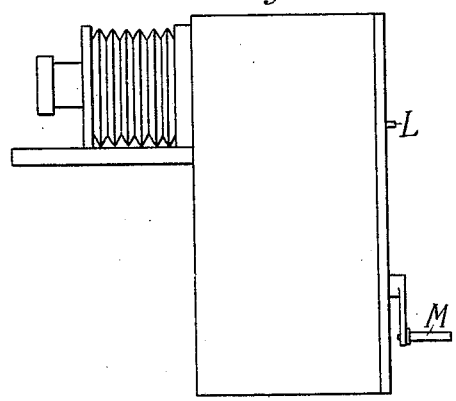

UNITED STATES PATENT OFFICE.

GEORGE DEMENY, OF LEVALLOIS-PERRET, FRANCE.

SERIES PHOTOGRAPHIC CAMERA.

SPECIFICATION forming part of Letters Patent No. 544,480, dated August 13, 1895.

Application filed February 20, 1894. Serial No. 500,882. (No model.)

*To all whom it may concern:*

Be it known that I, GEORGE DEMENY, a citizen of the Republic of France, residing at Levallois-Perret, near Paris, in the Republic of France, have invented certain new and useful Improvements in Photographic Apparatus; and I do hereby declare the following to be a full, clear, and exact description of the invention, such as will enable others skilled in the art to which it appertains to make and use the same.

This invention for improvements in photographic apparatus has for its object to enable a series of photographic images to be taken at equal and very short intervals on a sensitized film; and it consists, essentially, of an opaque disk adapted to be rotated and provided with an opening and of a sensitized band cut off from the light, except when the disk-opening is opposite the band, and geared to the disk in such manner that it is stationary while the disk-opening is passing it and is then moved onward, so that a fresh part of the band is opposite the disk-opening when next it comes opposite the band.

Figure 1:
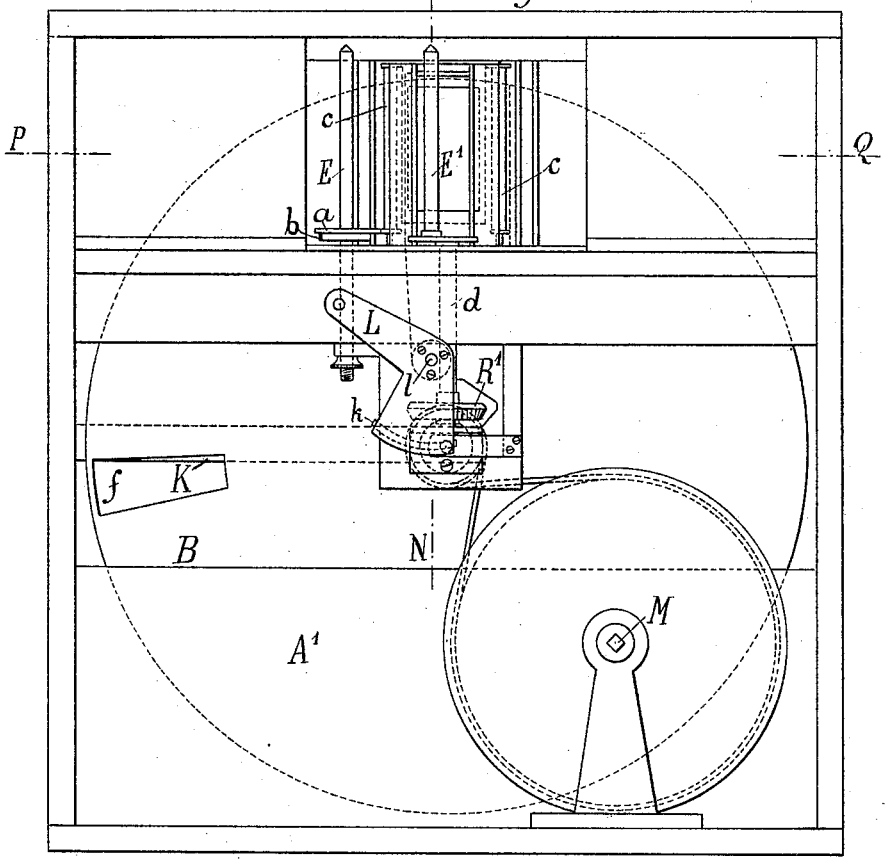
Figure 2:
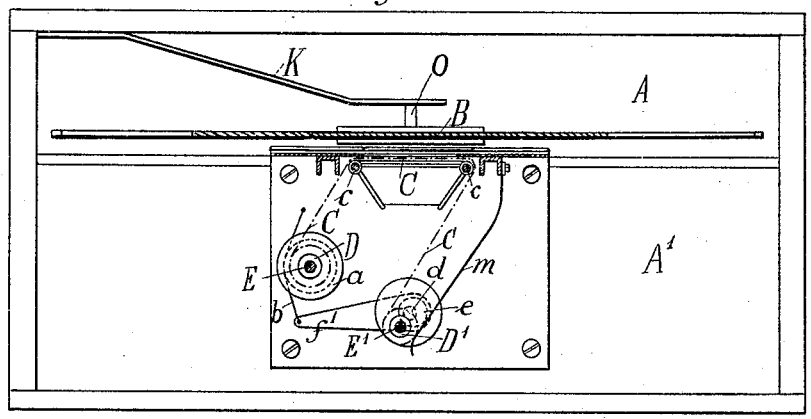

In the accompanying drawings, Figure 1 is a back elevation, with the back cover removed, of a complete photographic camera constructed according to this invention. Fig. 2 is a horizontal section on P Q, and Fig. 3 is a vertical section on line M N of the same. Fig. 4 is a side elevation of the camera on a reduced scale. Figs. 5 to 8 are detail views of the intermittent motion for the sensitized band.

The apparatus comprises a flat box divided into two compartments A A'. In the first compartment A is the disk-shutter B, passing close to the sensitized film C. In the second compartment A' is arranged the mechanism which causes the movement of the sensitized film. The box is provided with any suitable lens and may be fixed on a movable stand or pivots, so that it may be easily adjusted in any direction or made to follow an object in movement.

In order to effect the intermittent motion of the sensitized film C, it is rolled on a bobbin D and protected from the action of light by a band of opaque paper which serves for its extension. The paper may be replaced by the support of the sensitized film itself, rendered opaque by any suitable method. The bobbin D is forced onto a pin E and turns with it. A plate $a$ is also fixed on the pin E and a spring $b$ bears upon it, so as to prevent the momentum of the bobbin D from carrying it forward when the movement of the film ceases. From the bobbin D the film C passes over two rollers $c\ c$, on which it is stretched and between which the sensitized surface receives the impression of the light. The rollers $c$ allow of the movement of the film with the least possible friction. From the rollers $c$ the film passes to and is wound on a second bobbin D', to which its end is attached at the commencement of the operation.

The bobbin D', which takes the film after it has received the exposure, instead of being coaxial with the shaft $d'$, on which it turns, is fixed on a pin E', extending eccentrically from this shaft, so that when the shaft $d$ is turned with regularity the film winds round the bobbin D' with a variable speed, which becomes *nil* at a certain point. It is exactly at this moment of stoppage of the film that the opening $f$ of the shutter-disk B comes opposite and passes the film.

The axis O of the disk B, and the axis $d$, which carries the eccentric bobbin D', are connected together by bevel-gearing and are thus in positive connection.

The duration of the exposure of the film C is known mathematically, and the movement of the film is positive while a tension, indispensable to the clearness of the image, is assured.

Different shapes and different eccentricity could be given to the bobbin D', on which is wound the film, which would also permit of instantaneous exposures of the film being obtained under the conditions just explained. Thus, with the oval shape shown in Fig. 5, the exposure of the film will take place during a larger fraction of the duration of rotation than with a cylindrical bobbin.

Instead of a bobbin a plate $D^2$, as shown in Fig. 6, can be used, which will also give a longer duration of exposure. A double plate $D^3$, as shown in Fig. 7, can also be used, and this will give two stoppages for each complete revolution. This arrangement can be combined with two openings opposite one another on the shutter-disk, so that two negatives would be obtained at each turn of the disk. All these combinations, in which the winding of the film takes place with a variable speed, give known exposures, which can be made to coincide with the passage of one or several openings on the disk.

The eccentric movement or device can be introduced into the path of the film, which is wound, as shown in Fig. 8, on a bobbin D' turning at a uniform speed, and is actuated by the shutter-disk. The film passes from the bobbin D, over the rollers c, past the opening, over the eccentric $D^4$ to the bobbin D'. The eccentric $D^4$ turns about an axis, connected by gearing to the bobbin D' and thus to the axis of the shutter-disk. The effect of this eccentric $D^4$ is as follows: The bobbin D', actuated by the disk, moves the film in a uniform manner, but the eccentric $D^4$, on which the film bears, increases the length of the path $c\, D^4\, D'$, so that the speed of the unwinding is increased, and then diminishes the path $c\, D^4\, D'$, so that the diminution of length of the path $c\, D^4\, D'$ is exactly equal to the quantity wound on the bobbin D', and consequently there is a stoppage of the film between the points c c and a definite exposure. The position of the opening on the disk is adjusted so that the image is produced on the film during this stoppage, the value of which is exactly known. This arrangement is advantageous when long lengths of sensitized film are acted upon.

To insure the stoppage of the bobbin D at the same time that the winding-bobbin D' itself is stopped, so that the film may be uniformly extended while its sensitized surface receives the impression of the light, the pressure on the spring b is varied, being greater at the moment of stoppage of the film or even a little before this stoppage, and less between the stoppages, so that the movement of the film then becomes more free. In order to obtain this result the outer end of the rod f of the eccentric e is jointed to the free end of the band-spring b and makes the latter exercise a stronger pressure on the plate a at the moment desired for the stoppage. From these arrangements it results that the passage of the openings on the disk B coincide exactly with the moments when the film C is stationary and with the maximum friction exerted on the bobbin D. These three conditions are the best to insure the distinctness of the images, which are thus thrown on a stationary and stretched film.

In order that the taking of the images may be readily regulated, the shutter-disk, made of sheet-iron and actuated by any desired motor or simply by hand, has a mass sufficient to give it the capacity of a fly-wheel, and at the commencement of the operation rotates alone with its axis, and it is only when it is desired to commence taking images that its axis is put into gear with the rest of the apparatus. The clutch-gear consists of a projection g, rotated with the axis and which engages in an opening h of a plate H, connected to the bevel-wheel R, actuating the intermittent mechanism. The disk B is fixed on the axis O and is actuated by the movement of a band chain or gearing, which acts on a pulley P, M being the motive axis. The axis O carries fitted thereto a plate G, which turns with it and on which is the pin g. Opposite the plate G is another plate H with a slot h, which is connected to the bevel-wheel R and is free to turn and also to slide on the axis O. A spring K acts on the end of the axis and when this spring exerts its pressure and thrusts forward the axis O the disk B, with its axis O and the plate G, approach the plate H, and the pin g enters the slot h and the movement of the system takes place immediately. The coincidence of the stoppages of the film with the passages of the openings of the disk is also secured, since the bevel-wheels R R' are always engaged.

The engagement is effected by hand by means of the crank L, which, by means of a small cam k with inclined plane, presses in its position of rest on the extremity of the axis O and forces it endwise to lock the plates G and H together against the resistance of the spring K. On the contrary, it allows this spring to act when this crank is turned, so as to present against the axis a projection smaller than the cam k.

On the axis l of the crank L is fixed a shutter N, formed of a thin sheet of steel. The shutter N prevents the light from penetrating into the apparatus as long as the engagement does not take place, so that the passage of light and unwinding of the film are rendered absolutely simultaneous. The film, once passed onto the bobbin D', is protected by the paper which forms its extension, and a spring m prevents it unwinding.

What I claim, and desire to secure by Letters Patent, is—

1. A photographic apparatus for taking a series of photographic images on a continuous film at equal and very close intervals consisting of a continuously revolving shutter, of a continuously revolving bobbin, of gearing positively connecting the shutter and bobbin, of a sensitized band traversed intermittently by being wound on said bobbin and of a means for varying the length of the path of the film between the shutter orifice and the line where the film touches the bobbin, substantially as set forth.

2. In a photographic apparatus in which a series of photographic images are adapted to be taken at equal and very close intervals on a continuous band or film the mechanism for giving the band an intermittent motion from a continuously rotated part consisting of a shaft geared to the continuously rotating part and of an eccentric or cam surface on which the sensitized band is to be wound so that at one or more parts the eccentric or cam is compensated by the decreased length of path of the band so that the band is stationary, substantially as described.

3. In a photographic apparatus in which a series of photographic images are adapted to be taken at equal and very close intervals on a continuous band or film, the mechanism for giving the band an intermittent motion from a continuously rotated part consisting of a bobbin on which the film is to be wound and geared to the continuously rotating part and of an eccentric or cam surface continuously rotated and on which the band bears so that at a certain part the amount of band wound on the bobbin is compensated by the decreased length of path of the band, substantially as set forth.

4. In a photographic apparatus for taking a series of photographic images on a continuous film at equal and very close intervals the combination with the continuously revolving shutter and the sensitized band traversed intermittently by being wound on a bobbin geared to the shutter shaft, of a clutch gear adapted to connect the revolving shutter and revolving bobbin always in the same phase, of a movable shutter and of a means for simultaneously operating the clutch mechanism and the shutter, substantially as set forth.

In testimony whereof I have affixed my signature in presence of two witnesses.

GEORGE DEMENY.

Witnesses:
 CLYDE SHROPSHIRE,
 J. CAIRIE.